US011590575B2

(12) United States Patent
Smith et al.

(10) Patent No.: US 11,590,575 B2
(45) Date of Patent: Feb. 28, 2023

(54) METAL CONDENSATE CONTROL DURING ADDITIVE MANUFACTURING

(71) Applicant: GM GLOBAL TECHNOLOGY OPERATIONS LLC, Detroit, MI (US)

(72) Inventors: Mark A. Smith, Huntington Woods, MI (US); Tyson W. Brown, Royal Oak, MI (US); HyungMin Chae, Troy, MI (US); Md Ashabul Anam, Sterling Heights, MI (US); Whitney A. Poling, Rochester Hills, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 338 days.

(21) Appl. No.: 16/842,106

(22) Filed: Apr. 7, 2020

(65) Prior Publication Data
US 2021/0308759 A1 Oct. 7, 2021

(51) Int. Cl.
*B22F 10/00* (2021.01)
*B22F 3/10* (2006.01)
*B33Y 10/00* (2015.01)
*B33Y 30/00* (2015.01)
*B22F 10/10* (2021.01)

(52) U.S. Cl.
CPC ............ *B22F 10/00* (2021.01); *B22F 3/1028* (2013.01); *B22F 10/10* (2021.01); *B22F 2202/11* (2013.01); *B33Y 10/00* (2014.12); *B33Y 30/00* (2014.12)

(58) Field of Classification Search
CPC ........ B22F 10/00; B22F 3/1028; B22F 10/10; B22F 2202/11; B33Y 10/00; B33Y 30/00
See application file for complete search history.

(56) References Cited

U.S. PATENT DOCUMENTS

| 8,021,138 | B2 * | 9/2011 | Green | B33Y 30/00 425/375 |
|---|---|---|---|---|
| 2008/0317951 | A1 | 12/2008 | Green | |
| 2017/0246709 | A1 | 8/2017 | Guerrier et al. | |
| 2018/0043614 | A1 * | 2/2018 | Greenfield | B29C 64/153 |
| 2020/0016657 | A1 | 1/2020 | Hart | |

FOREIGN PATENT DOCUMENTS

CN 110468296 A 11/2019

\* cited by examiner

*Primary Examiner* — Sally A Merkling
*Assistant Examiner* — Ricardo D Morales
(74) *Attorney, Agent, or Firm* — Quinn IP Law

(57) ABSTRACT

A system and method for additive manufacturing are provided. The system includes a structure defining a chamber for manufacturing parts via additive manufacturing. A powder metal applicator is configured to deposit layers of powder metal material to build a part on a build platform. A laser source is configured to direct one or more laser beams onto each layer of powder metal material to fuse the powder metal material, wherein metal condensate is created by the laser beam(s) contacting the powder metal material. An element spaced apart from the layers of powder material has a temperature different than the chamber temperature, so that the element is configured to attract or repel the metal condensate by virtue of the temperature differential between the element and the chamber. The method includes using the element having the different temperature to attract or repel the metal condensate within the chamber.

12 Claims, 6 Drawing Sheets

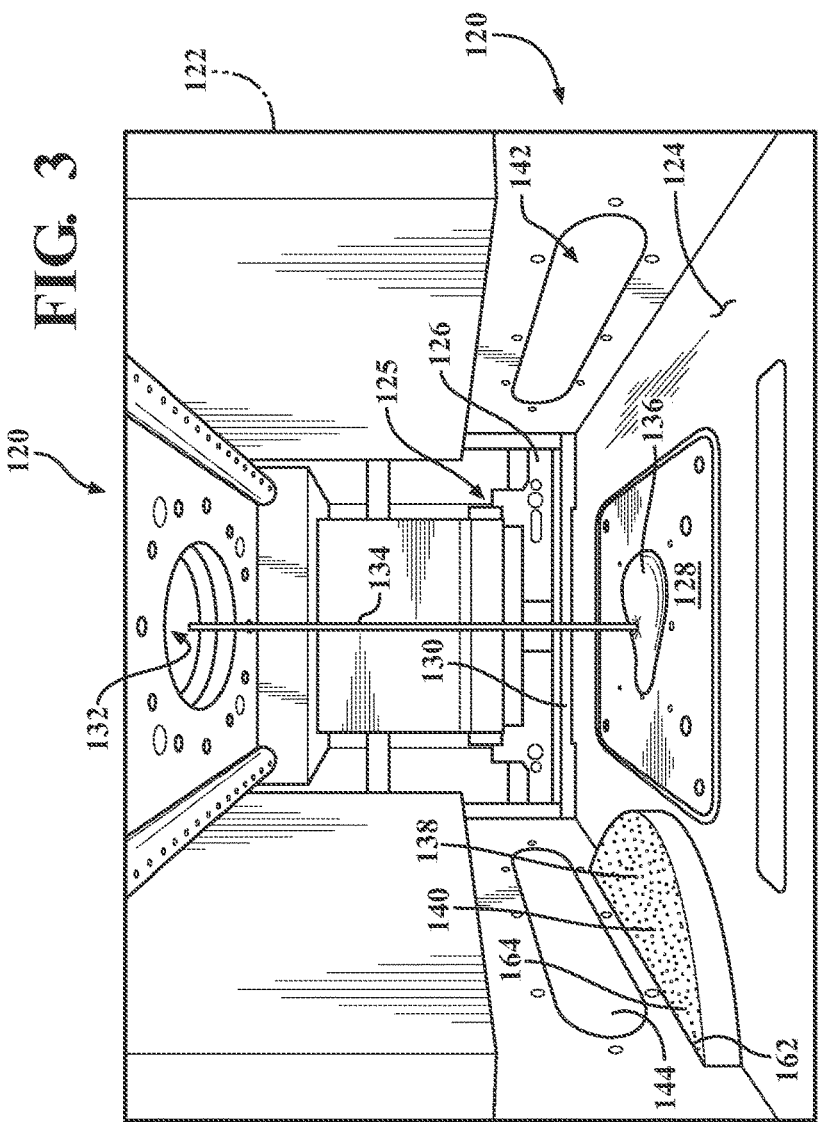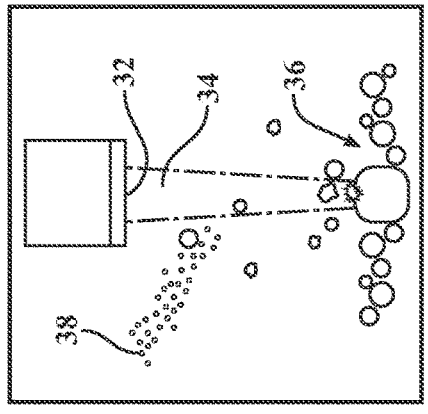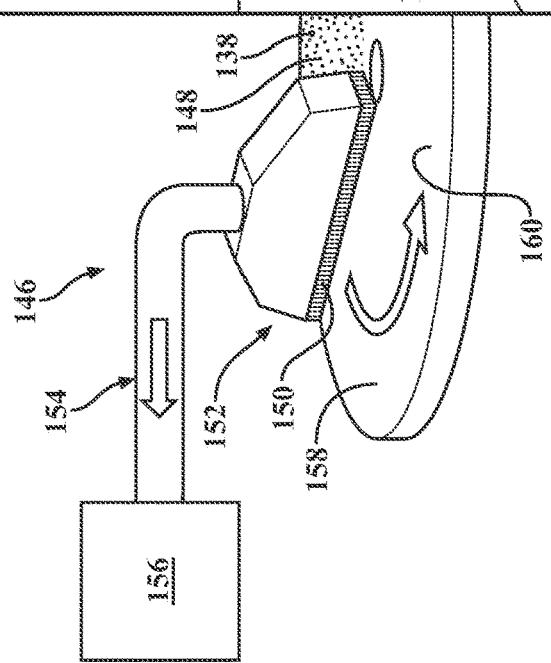

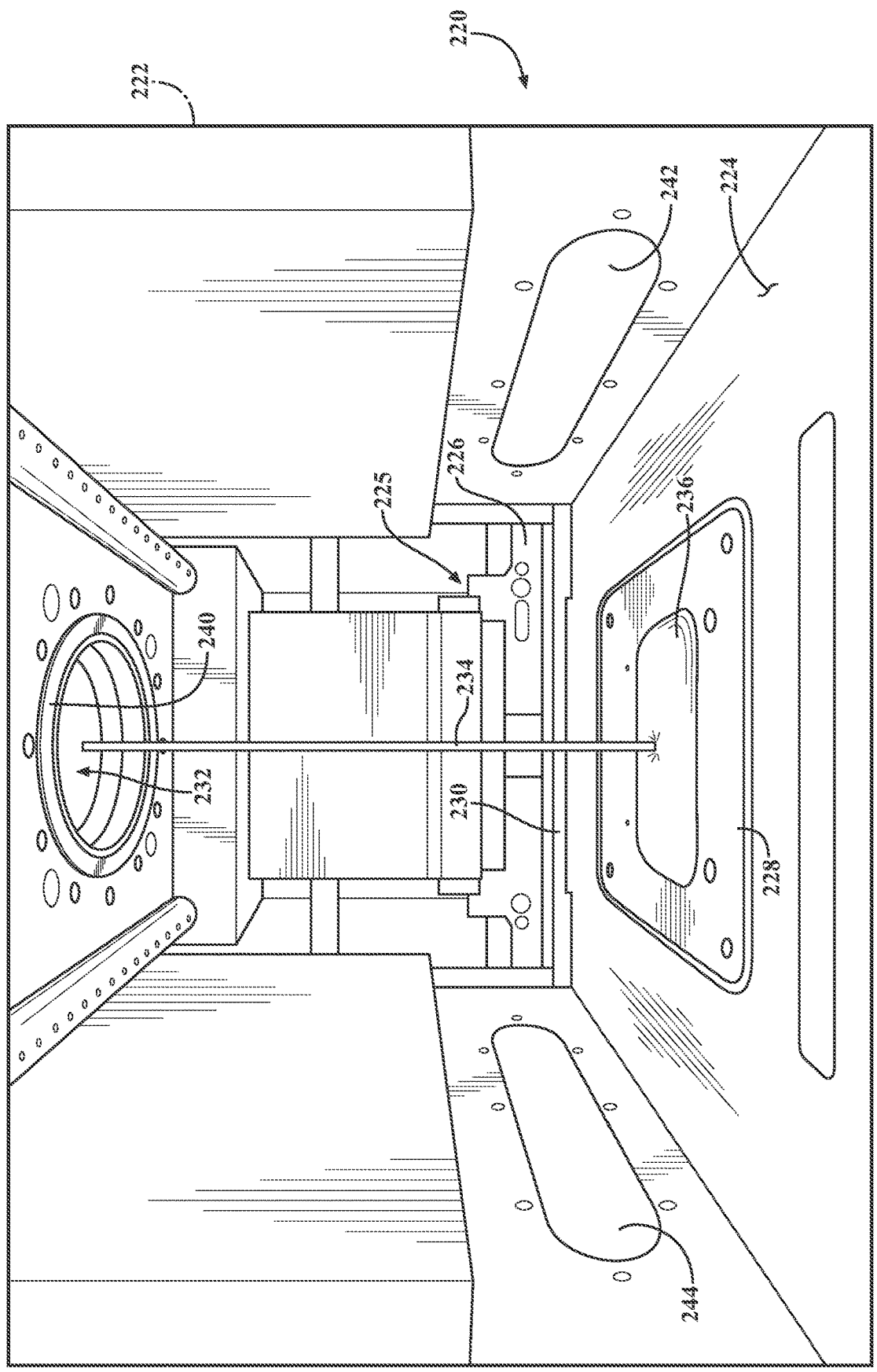

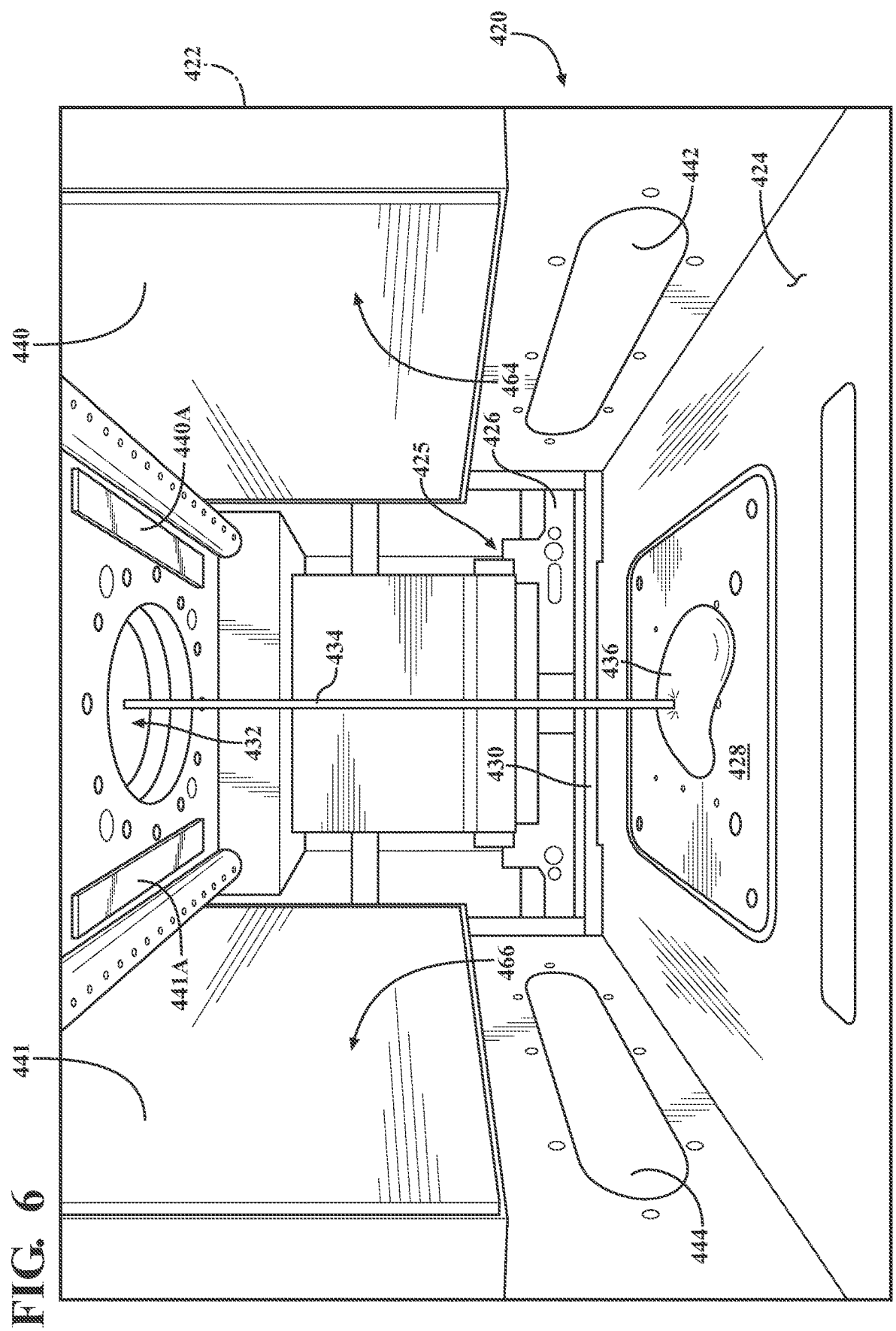

METAL CONDENSATE CONTROL DURING ADDITIVE MANUFACTURING

INTRODUCTION

The present disclosure relates to additive manufacturing systems and methods for forming a part by adding material in a sequential process, typically layer by layer.

Additive manufacturing, also known as 3-D printing, refers to a process for creating a three-dimensional object through automated control by sequential layer material addition/joining within a three-dimensional work envelope. Objects can be manufactured in various shapes and geometries and can include sacrificial or support materials, enabling design shapes that were previously unachievable. Various additive manufacturing processes are known, differing primarily in the way that material layers are deposited and in materials used. In particular, additive manufacturing processes can include, for example, fused deposition modeling, laser sintering, electron beam melting, and inkjet 3D printing, using materials such as thermoplastic filaments, metal powders, plaster, resins, and concrete.

In a powder bed fusion process, a laser beam is used to fuse each layer of a previously-leveled powder material into successive sheets of fused powder material. During the fusion process, the laser vaporizes some of the powder and creates nanometer-sized or micrometer-sized dust, referred to as "condensate." The condensate may accumulate within the chamber. For example, the condensate may build up on chamber walls, on the laser lens, and on laid powder of the object being manufactured.

In the case of metal additive manufacturing, it takes hours or even days to clean the condensate from the build chamber using a vacuum and wipes with isopropanol to scrub the build chamber. The cleaning process significantly slows down the additive manufacturing process, which significantly hinders the use of metal additive manufacturing for any high-volume production. Further, condensate contamination of the powder bed or the powder to be recycled after the build can reduce part quality by contributing to defects within the part, as well as contributing to further delay in the process.

SUMMARY

The present disclosure provides a system and method that aids in the control of metal condensate during a powder bed fusion manufacturing process. The system and method include the use of cooled and/or heated elements to attract or repel the metal condensate. Therefore, the metal condensate can be repelled by one or more heated elements and/or collected by one or more cooled elements within the build chamber.

In one form, which may be combined with or separate from other forms disclosed herein, an additive manufacturing system is provided that includes a structure defining a chamber for manufacturing parts via additive manufacturing. The chamber has a chamber temperature. A powder metal applicator is configured to deposit layers of powder metal material to build a part on a build platform. A laser source is configured to direct one or more laser beams onto each layer of powder metal material to fuse the powder metal material, wherein metal condensate is created by the laser beam(s) contacting the powder metal material. An element is spaced apart from the layers of powder material. The element has an element temperature different than the chamber temperature, and the element is configured to attract or repel the metal condensate by virtue of a temperature differential between the element and the chamber.

In another form, which may be combined with or separate from the other forms disclosed herein, a method of additive manufacturing is provided that includes disposing powder metal material, layer by layer, onto a build platform within a chamber, the chamber having a chamber temperature. The method also includes directing one or more laser beams into the chamber to contact each layer of powder metal material to fuse the powder metal material for additive manufacturing, wherein metal condensate is generated from the laser beam(s) contacting the powder metal material. The method further includes attracting or repelling the metal condensate with an element having an element temperature that is different from the chamber temperature.

Additional features may optionally be provided, including but not limited to the following: the temperature differential being at least 10 degrees Celsius or the chamber temperature and the element temperature being at least ten degrees Celsius different from one another; wherein the element temperature is lower than the chamber temperature, and the element is configured to attract the metal condensate; the element being a plate; the element being a rotating platform; wherein the element temperature is greater than the chamber temperature, and the element is configured to repel the metal condensate; further comprising a lens through which the laser beam or beams are directed, the element surrounding the lens; further comprising a powder overflow receptacle configured to collect excess powder metal material, the element being disposed around the powder overflow receptacle to repel the metal condensate away from the powder overflow receptacle; further comprising a gas flow system including an inlet disposed on an upstream side of the build platform and an outlet disposed on a downstream side of the build platform, the inlet configured to flow a stream of gas through the chamber to move the metal condensate within the chamber, wherein the element is a cooled element disposed on the downstream side of the build platform to attract the metal condensate; the additive manufacturing system further comprising a heated element disposed on the upstream side of the build platform to repel the metal condensate; further comprising a filter system configured to remove the metal condensate from the rotating platform and to feed the metal condensate to a filter; the build platform configured to rotate about a central axis; the element being disposed outwardly around the build platform; further comprising a tube disposed along the central axis and configured to deliver heated gas across the build platform to repel the metal condensate toward the element; rotating the element to collect and remove the metal condensate; the element being a cooled element or a heated element; rotating a build platform about a central axis, the element being disposed outwardly around the build platform; and/or delivering a heated gas across the build platform to repel the metal condensate toward the element.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The drawings herein are schematic in nature and are not necessarily drawn to scale or representative of the distances or relationships between the elements shown.

FIG. 2 is a schematic view of a laser fusing process of an additive manufacturing system, according to the principles of the present disclosure;

FIG. 3 is a schematic perspective view of another additive manufacturing system, in accordance with the principles of the present disclosure;

FIG. 4 is a schematic perspective view of yet another additive manufacturing system, according to the principles of the present disclosure;

FIG. 6 is a schematic perspective view of still another additive manufacturing system, according to the principles of the present disclosure;

DETAILED DESCRIPTION

Figure 1:
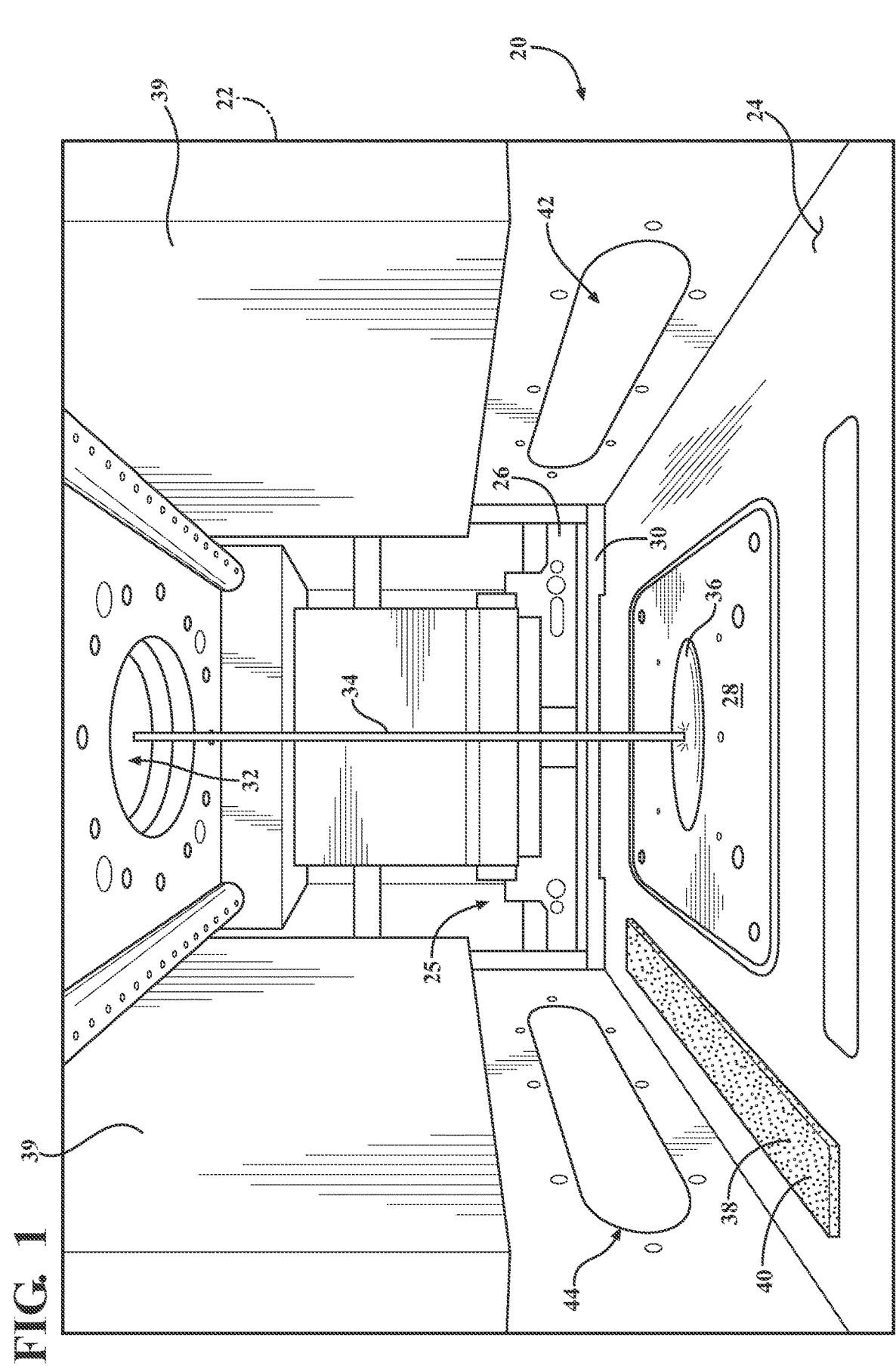
FIG. 1 is a schematic perspective view of an additive manufacturing system, in accordance with the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are systems and methods for forming components via additive manufacturing. The systems and methods utilize laser energy sources to iteratively form metal layers from powder metal material or wire. Metal additive manufacturing is a process by which a solid three-dimensional metallic structure is built layer-by-layer, typically where energy or heat is selectively applied to, and absorbed by, starting materials or feedstocks (e.g., in the form of powders or wires) to melt, consolidate, solidify, fuse, or sinter and create a layer of solid material. Additive manufacturing is often referred to synonymously with three-dimensional printing. Non-limiting examples of additive manufacturing processes include powder bed fusion processes (e.g., laser sintering, laser melting, electron beam melting, and selective heat sintering), direct metal deposition, fused deposition modeling, blown powder processes (e.g., directed energy deposition), wire-fed directed energy deposition (e.g., wire extrusion processes), liquid metal 3D printing systems, ultrasonic consolidation (e.g., via an ultrasonic energy source), and binder jetting, among others. Metal feedstocks can optionally include chemical or polymeric binders, in some embodiments.

A digital three-dimensional modeling system can be used to create a digital model, or build plan, of the component to be formed. The physical component can then be formed from the digital model by an additive manufacturing system that creates solid fused structures in a layer-by-layer building process. The location and/or path that the energy source is applied to the metal feedstocks is defined by each respective cross-sectional layer of the three-dimensional product, for example as defined by the digital model thereof.

The application of energy to the metal feedstock causes alloying, phase changes, and/or compositional changes thereto. For example, a metal feedstock may include a mixture of unalloyed metals and the application of energy can produce an alloyed metal from the metal feedstock. The intensity, application time, and/or application pattern of the energy source can be used to achieve particular material properties of the material layer formed from the metal feedstock.

In the case of powder bed fusion additive manufacturing, for example, a thin layer of the powdered material is spread over a powder bed, and the energy source (e.g., a laser) is directed onto the powdered material to melt the powdered material where the laser is applied. The melted material solidifies, thereby forming a thin cross-sectional layer of a product. Another layer of the powdered material is spread over the previously formed layer, and the energy source is directed onto the powdered material to melt the powdered material and fuse it with the underlying layer where the laser is applied. The melted material solidifies, thereby forming a slightly thicker cross-sectional layer of the product. The process is repeated until the entire three-dimensional product is formed.

The metal feedstocks or powders used in additive manufacturing can include metals, such as aluminum alloys (e.g., $AlSi_{10}Mg$, $AlSi_{12}$), copper alloys, nickel alloys, titanium alloys (e.g., $Ti_6Al_4V$), cobalt chromium alloys (e.g., ASTM F75), austenitic nickel chromium alloys, steel alloys, including automotive steels, stainless steels (e.g., 316L, 17-4 PH, and 15-5 PH), maraging steels, and structural steels (e.g., HSLA 420, 4140), among many other metal feedstocks. In general, the systems and methods provided herein may utilize any suitable metal feedstocks as would be identified as suitable by one of skill in the art.

Referring now to FIG. 1, a system for metal additive manufacturing is illustrated and generally designated at 20. The system 20 includes a structure 22 defining a build chamber 24 for manufacturing parts via additive manufacturing, or in other words, for building a three-dimensional printed part layer by layer. Preferably, a powder bed fusion process of additive manufacturing is used, which includes depositing layers of powder material from a powder hopper 25 through a powder metal applicator 26 onto a build platform 28, leveling each layer with a wiper 30, and fusing a portion of each layer with a laser beam 34, or multiple laser beams, are directed through a window or lens 32 to build the part, layer by layer. The chamber 24 may be brought into vacuum and filled with an inert gas, such as argon or another noble gas. Although a powder bed fusing additive manufacturing system 20 is shown and described, the additive manufacturing system 20 could be another type of additive manufacturing system, such as those described above.

The powder hopper 25 contains metal powder, such as aluminum, steel, titanium, or any other desired metal material, such as those described above. The powder hopper 25 and/or the build platform 28 may be fixed or may be part of an elevator system that moves vertically to create multiple layers of the powder material. The powder metal applicator 26, for example, is configured to deposit a plurality of layers of the powder metal material to build a part on the build platform 28. The laser source, which may be disposed outside of the chamber 24, is configured to direct a laser beam 34 (or multiple laser beams 34) through the transparent lens 32 onto each layer of powder metal material, typically in a predefined target area, to fuse the powder metal material and form the part. For example, the laser beam(s) 34 may be scanned over a predetermined target area on each layer of powder material to fuse the powder material into a layer having a desired shape. The next layer is then deposited over a fused layer, wiped with the wiper 30, and then the new layer is fused by the laser beam(s) 34, and so on.

Referring now to FIG. 2 and with continued reference to FIG. 1, when the laser beam 34, or beams, contacts the powder metal material 36, metal condensate 38 is created. The metal condensate 38 may be nanometer-sized or micrometer-sized particles or flakes, such as on the order of less than one micrometer up to 10, 15, or 20 micrometers, by way of example. To reduce or eliminate the amount of particles of the metal condensate 38 that may coat walls 39, the lens 32, the part, or other parts of the structure 22 of the build chamber 24, the system 20 includes an element 40 that is spaced apart from the plurality of layers of powder material that are layered to form the part on the build platform 28, where the element 40 is configured to attract or repel the metal condensate 38.

The element 40 could take on several different forms, which will be described in more detail below. The element 40 has an element temperature that is different than the chamber temperature, so that the element 40 is configured to attract or repel the metal condensate 38 created by the laser beam(s) 34 by virtue of a temperature differential between the element 40 and the chamber 24.

In the example illustrated in FIG. 1, the element 40 is a cooled plate that is configured to attract the condensate particles 38 because the plate 40 is cooler than the temperature within the chamber 24. Accordingly, the condensate particles 38 are attracted to the cooled plate 40 by principles of or thermodynamics or thermophoresis, by way of example. Under the principles of thermophoresis, because the condensate particles are very small, they are repelled in a direction away from a heat gradient. In this case, that means the condensate 38 is attracted toward the cooled plate 40. The temperature of the cooled plate 40 may be lower than the temperature in the chamber 24 by any desired amount. In general, the greater the temperature gradient between the air in the chamber 24 and the cooled plate 40, the more successful the cooled plate 40 will be at attracting the condensate 38 to the cooled plate 40. In some examples, the cooled plate 40 is at least 10 degrees Celsius lower in temperature than the air or gas in the chamber 24. For example, the chamber temperature may be ambient at 20-25 degrees Celsius, and the plate 40 may be below 15 degrees Celsius or below 10 degrees Celsius. In some examples, the plate 40 may have a much lower temperature, such as under −180 degrees Celsius, or anywhere in between ambient and as cold as is possible to practically achieve via the plate 40.

The plate 40 may be larger than the build platform 28, or at least larger than the build area, in some examples. In general, the larger the cooled plate 40, the more condensate particles that the cooled plate 40 will be able to attract and collect.

The cooled plate 40 could be cooled in any desirable manner. For example, the cooled plate 40 could have a cooling effect continuously applied to it. In one example, the cooled plate 40 could be cooled by refrigeration, such as by circulating a cooled fluid (such as liquid nitrogen, argon, or glycol) through or across the plate 40. In the alternative, the plate 40 could be cooled in advance by such cooled fluids, but without continuously applying the cooled fluids to the plate 40. In some examples, a cooled fluid may be sprayed onto or otherwise applied onto the plate 40 to cool the plate 40 before use.

The cooled plate 40 or other element could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred.

In addition to the cooled plate 40, the system 20 may include a laminar gas flow system including an inlet 42 disposed on an upstream side of the build platform 28 and an outlet 44 disposed on a downstream side of the build platform 28. The inlet 42 is configured to flow a stream of gas through the chamber 24 to move the metal condensate 38 within the chamber 24. The plate 40 is disposed on the downstream side of build platform 28 in the direction that the gas flows. The metal condensate may be collected into a filter (not shown) through the outlet 44, by way of example. The gas may be heated like the heated gas described with reference to FIG. 7, if desired, to aid in repelling the metal condensate 38 in the direction that the gas is flowing.

Referring now to FIG. 3, another system for metal additive manufacturing is illustrated and generally designated at 120. The system 120 may be similar to the system 20 described above, except where described as being different. For example, the system 120 includes a structure 122 defining a build chamber 124 for manufacturing parts 136 via additive manufacturing. The system 120 is for powder bed fusion additive manufacturing, by way of example only, and includes a powder hopper 125, wherein powder metal is applied layer by layer onto a build platform 128 through a powder metal applicator 126, and each layer is leveled with a wiper 130. A portion of each layer is fused with a laser beam 134, or multiple laser beams, directed through a lens 132 to build the part 136, layer by layer. When the laser beam 134 contacts the powder metal material, metal condensate 138 is created, as shown in FIG. 2 (the condensate is shown as element 38 in FIG. 2).

The system 120 includes an element 140 that is spaced apart from the plurality of layers of powder material that are layered to form the part 136, where the element 140 is configured to attract or repel the metal condensate 138. In this case, the element 140 is a rotating platform, such as a wheel that rotates, or the element 140 could be a conveyor belt that moves into and out of the chamber 124. In the example of FIG. 3, the element 140 is a rotating platform that rotates about an axis of rotation, and less than half of the rotating platform 140 is located in the chamber 124 at any given rotational angle of the rotating platform 140.

A filter system 146 is provided to clean a portion 148 of the rotating platform 140 that is currently disposed outside of the chamber 124. For example, the filter system 146 may include a brush 150 that brushes the rotating platform 140. The brush 150 may be disposed on an end 152 of a vacuum tube 154 that is configured to suck the condensate 138 from the rotating platform through the tube 154 and into a filter 156. Thus, the filter system 146 is configured to remove the metal condensate 138 from the rotating platform 140 and feed the metal condensate 138 to the filter 156.

Exhaust air or gas may be applied to a portion 158 of the rotating platform adjacent to the brush 150, while chilled air or fluid may be applied to a portion 160 of the rotating platform 140 adjacent to an opening 162 in the chamber, so that the cooled portion 160 of the rotating platform enters the chamber 124 to collect more condensate 138.

The rotating platform 140 could be cooled in any desirable manner. For example, the rotating platform 140 could have a cooling effect continuous applied to it, for example, chilled gas or liquid may be applied at portion 160. In one example, the rotating platform 140 could be cooled by refrigeration, such as by circulating a cooled fluid (such as liquid nitrogen, argon, or glycol) through or onto the rotating platform 140. In the alternative, the rotating platform 140 could be cooled in advance by such cooled fluids, but without continuously applying the cooled fluids to the rotating platform 140. In some examples, a cooled fluid (gas or liquid) may be sprayed onto or otherwise applied onto the rotating platform 140 to cool the portion 160 of the rotating platform 140 prior to rotating the portion 160 into the chamber 124.

Similar to the element 40 shown and described with respect to FIG. 1, the rotating platform 140 has an element temperature that is lower than the chamber temperature, so that the rotating platform 140 is configured to attract the metal condensate 138 created by the laser beam(s) 134 by virtue of a temperature differential between the rotating platform 140 and the chamber 124. The temperature of the portion 164 of the rotating platform 140 located in the chamber 124 may be lower than the temperature in the chamber 124 by any desired amount. In some examples, the portion 164 of the rotating platform 140 within the chamber 124 is at least 10 degrees Celsius lower in temperature than the air in the chamber 124. For example, the chamber temperature may be ambient at 20-25 degrees Celsius, and the portion 164 of the rotating platform 140 may be below 15 degrees Celsius or below 10 degrees Celsius. In some examples, the portion 164 of the rotating platform 140 located in the chamber 124 may have a much lower temperature, such as under −180 degrees Celsius, or anywhere in between ambient and as cold as is possible to practically achieve via the rotating platform 140.

The rotating platform 140 or other element could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred.

The system 120 may include a laminar gas flow system, similar to that described above with respect to FIG. 1, including an inlet 142 disposed on an upstream side of the build platform 128 and an outlet 144 disposed on a downstream side of the build platform 128. The inlet 142 is configured to flow a stream of gas through the chamber 124 to move the metal condensate 138 within the chamber 124. The metal condensate 138 may be collected into a filter (may be the same or separate from the filter 156) through the outlet 144, by way of example.

Referring now to FIG. 4, yet another system for metal additive manufacturing is illustrated and generally designated at 220. The system 220 may be similar to the systems 20, 120 described above, except where described as being different. For example, the system 220 includes a structure 222 defining a build chamber 224 for manufacturing parts 236 via additive manufacturing. The system 220 is for powder bed fusion additive manufacturing, by way of example, and includes a powder hopper 225, wherein powder metal is applied layer by layer onto a build platform 228 through a powder metal applicator 226 and each layer is leveled with a wiper 230. A portion of each layer is fused with a laser beam 234, or multiple laser beams, directed through a lens 232 to build the part 236, layer by layer. When the laser beam 234 contacts the powder metal material, metal condensate 38 is created (as shown in FIG. 2).

The system 220 includes an element 240 that is spaced apart from the plurality of layers of powder material that are layered to form the part 236, where the element 240 is configured to attract or repel the metal condensate. In this case, the element 240 surrounds the lens 232 through which the laser beam 234 is directed. The element 240 may be shaped as a ring, or it may have another shape and may be continuous or separate pieces surrounding the lens 232.

The ring 240 has a temperature that is greater than the chamber temperature, and therefore, the ring 240 is configured to repel the metal condensate away from the ring 240 and therefore away from the lens 232, for example, through principles of thermodynamics and/or thermophoresis, by virtue of a temperature differential between the ring 240 and the chamber 224. The temperature of the ring 240 may be greater than the temperature in the chamber 224 by any desired amount. In some examples, the ring 240 within the chamber 224 is at least 10 degrees Celsius greater in temperature than the air or gas in the chamber 224. For example, the chamber temperature may be ambient at 20-25 degrees Celsius, and the ring temperature may be above 30 or 35 degrees Celsius. In some examples, the ring 240 may have a much higher temperature, such as 50, 100, 150, or 200 degrees Celsius, or greater.

The ring 240 could be heated in any desirable manner. For example, heat could be continuously applied to or through the ring 240, for example, with electricity or heated gas or liquid.

The ring 240 or other element surrounding the lens 232 could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred.

The system 220 may include a laminar gas flow system, similar to that described above with respect to FIGS. 1 and 3, including an inlet 242 disposed on an upstream side of the build platform 228 and an outlet 244 disposed on a downstream side of the build platform 228. The inlet 242 is configured to flow a stream of gas through the chamber 224 to move the metal condensate within the chamber 224. The metal condensate may be collected into a filter (not shown) through the outlet 244, by way of example.

Figure 5:
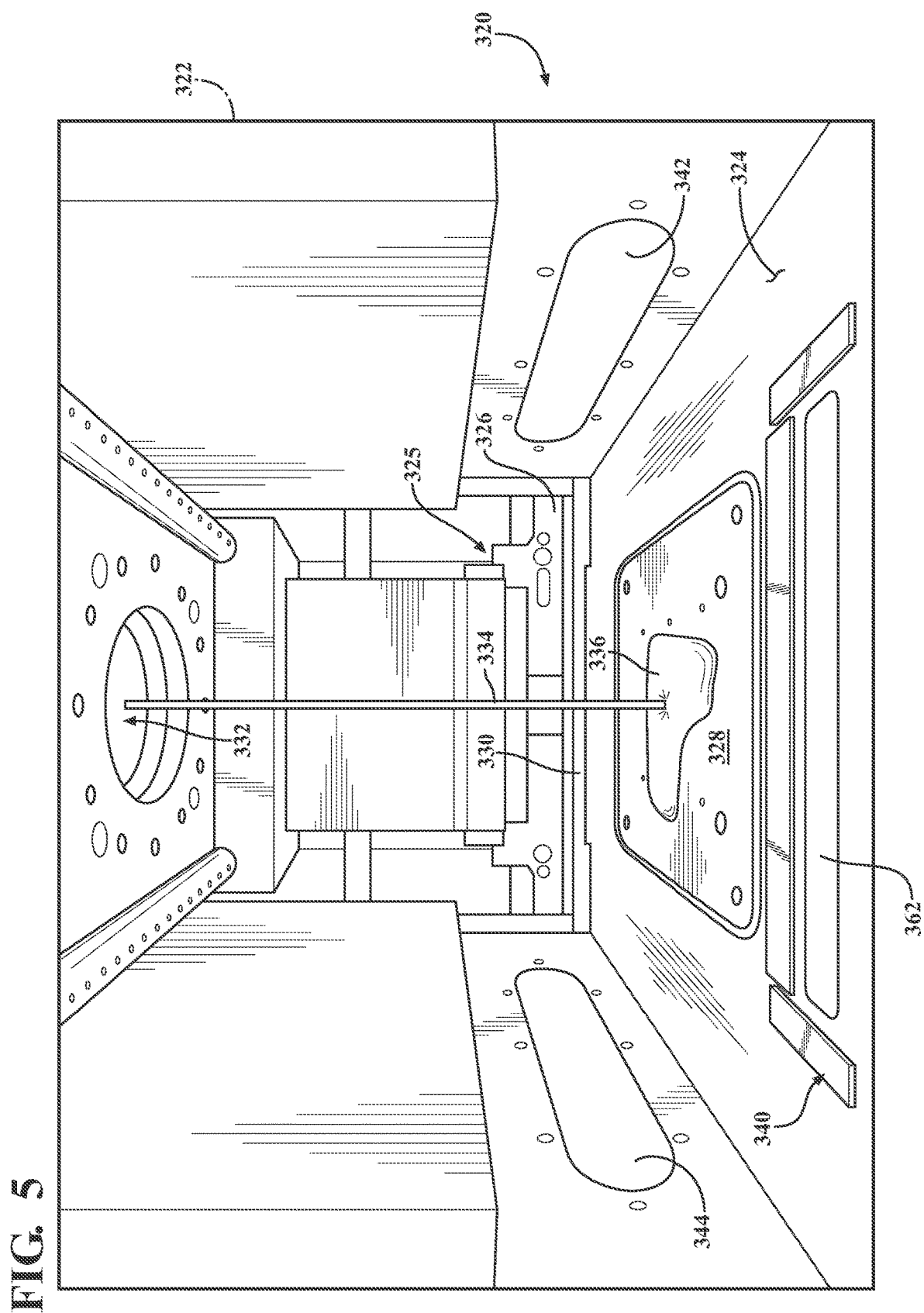
FIG. 5 is a schematic perspective view of still another additive manufacturing system, in accordance with the principles of the present disclosure.

Referring now to FIG. 5, still another system for metal additive manufacturing is illustrated and generally designated at 320. The system 320 may be similar to the systems 20, 120, 220 described above, except where described as being different. For example, the system 320 includes a structure 322 defining a build chamber 324 for manufacturing parts 336 via additive manufacturing. Like the systems 20, 120, 220 described above, the system 320 shown in FIG. 5 may be designed for powder bed fusion additive manufacturing and includes a powder hopper 325, wherein powder metal is applied layer by layer onto a build platform 328 through a powder metal applicator 326, and each layer is leveled with a wiper 330. A portion of each layer is fused with a laser beam 334, or multiple laser beams, directed through a lens 332 to build the part 336, layer by layer. When the laser beam 334 contacts the powder metal material, metal condensate 38 is created, as shown in FIG. 2.

The system 320 includes an element 340 that is spaced apart from the plurality of layers of powder material that are layered to form the part 336, where the element 340 is configured to attract or repel the metal condensate. In this case, the element 340 includes a plurality of pieces that surround a powder overflow receptacle 362 configured to collect excess powder metal material scraped from the build platform 328 with the wiper 330. The element 340 is disposed around the powder overflow receptacle 362 to repel the metal condensate away from the powder overflow receptacle 362, and therefore, the element 340 has a temperature that is greater than the chamber temperature, similar to the ring 240 described above. The element 340 is configured to repel the metal condensate away from the powder overflow receptable 362 to keep the excess powder metal in the receptacle 362 clean and able to be reused. (When contaminated with a sufficient amount of metal condensate, the excess powder metal is not reusable).

Like the ring 240, the element 340 surrounding the powder overflow receptacle 362 repels the metal condensate, for example, through principles of thermodynamics and/or thermophoresis, by virtue of a temperature differential between the element 340 and the chamber 324. The temperature of the element 340 may be greater than the temperature in the chamber 324 by any desired amount. In some examples, the element 340 is at least 10 degrees Celsius greater in temperature than the air or gas in the chamber 324. For example, the chamber temperature may be ambient at 20-25 degrees Celsius, and the element temperature may be above 30 or 35 degrees Celsius. In some examples, the element 340 may have a much higher temperature, such as 50, 100, 150, or 200 degrees Celsius, or greater.

The element 340 could be heated in any desirable manner. For example, heat could be continuously applied to or through the element 340, for example, with electricity or heated gas or liquid.

The element 340 surrounding the powder overflow receptacle 362 could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred.

The system 320 may include a laminar gas flow system, similar to that described above with respect to FIGS. 1, 3, and 4, including an inlet 342 disposed on an upstream side of the build platform 328 and an outlet 344 disposed on a downstream side of the build platform 328. The inlet 342 is configured to flow a stream of gas through the chamber 324 to move the metal condensate within the chamber 324. The metal condensate may be collected into a filter (not shown) through the outlet 344, by way of example.

Referring now to FIG. 6, still another system for metal additive manufacturing is illustrated and generally designated at 420. The system 420 may be similar to the systems 20, 120, 220, 320 described above, except where described as being different. For example, the system 420 includes a structure 422 defining a build chamber 424 for manufacturing parts 436 via additive manufacturing. Like the systems 20, 120, 220, 320 described above, the system 420 shown in FIG. 6 may be designed for powder bed fusion additive manufacturing and includes a powder hopper 425, wherein powder metal is applied layer by layer onto a build platform 428 through a powder metal applicator 426, and each layer is leveled with a wiper 430. A portion of each layer is fused with a laser beam 434 directed through a lens 432 to build the part 436, layer by layer. When the laser beam(s) 434 contact the powder metal material, metal condensate 38 is created, as shown in FIG. 2.

The system 420 includes a plurality of elements 440, 440A, 441, 441A that are spaced apart from the plurality of layers of powder material that are layered to form the part 436, where the elements 440, 440A, 441, 441A are configured to attract or repel the metal condensate.

The system 420 may also include a laminar gas flow system, similar to that described above with respect to FIGS. 1, 3, 4, and 5, including an inlet 442 disposed on an upstream side of the build platform 428 and an outlet 444 disposed on a downstream side of the build platform 428. The inlet 442 is configured to flow a stream of gas through the chamber 424 to move the metal condensate within the chamber 424. The metal condensate may be collected into a filter (not shown) through the outlet 444, by way of example.

Two of the elements 440, 440A are warmer than the chamber temperature and are disposed on an upstream side of the build platform 428 and/or the laser lens 432. The other two elements 441, 441A are cooler than the chamber temperature and are disposed on a downstream side of the build platform 428 and/or the laser lens 432.

In this case, one warmer element 440 is disposed along the upstream wall 464 of the chamber 424, and the other warmer element 440A is disposed on the upstream side of the laser lens 432. Like the other elements 240, 340 described as being warmer than the chamber temperature, the elements 440, 440A are configured to repel the condensate within the chamber 424, for example, through principles of thermodynamics and/or thermophoresis, by virtue of a temperature differential between the warmer elements 440, 440A and the chamber 424. The temperature of the warmer elements 440, 440A may be greater than the temperature in the chamber 424 by any desired amount. In some examples, the warmer elements 440, 440A within the chamber 424 are at least 10 degrees Celsius greater in temperature than the air or gas in the chamber 424. For example, the chamber temperature may be ambient at 20-25 degrees Celsius, and the warmer element temperatures may be above 30 or 35 degrees Celsius. In some examples, the warmer elements 440, 440A may have a much higher temperature, such as 50, 100, 150, or 200 degrees Celsius, or greater.

The warmer elements 440, 440A could be heated in any desirable manner. For example, heat could be continuously applied to or through the warmer elements 440, 440A, for example, with electricity or heated gas or liquid.

One of the cooler elements 441 is disposed along the downstream wall 466 of the chamber 424, and the other cooler element 441A is disposed on the downstream side of the laser lens 432. Like the other elements 40, 140 described as being cooler than the chamber temperature, the elements 441, 441A are configured to attract the condensate within the chamber 424, for example, through principles of thermodynamics and/or thermophoresis, by virtue of a temperature differential between the cooler elements 441, 441A and the chamber 424.

The temperature of the cooler elements 441, 441A may be lower than the temperature in the chamber 424 by any desired amount. In some examples, the cooler elements 441, 441A are at least 10 degrees Celsius lower in temperature than the air in the chamber 424. For example, the chamber temperature may be ambient at 20-25 degrees Celsius, and the cooler elements 441, 441A may be below 15 degrees Celsius or below 10 degrees Celsius. In some examples, the cooler elements 441, 441A may have a much lower temperature, such as under −180 degrees Celsius, or anywhere in between ambient and as cold as is possible to practically achieve via the elements 441, 441A.

The elements 440, 440A, 441, 441A could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred. The elements 440, 440A, 441, 441A may be heated or cooled in any desirable way, such as in the manners described above with respect to FIGS. 1, 3, 4, and 5.

The laminar flow system and the elements 440, 440A, 441, 441A cooperate to repel condensate from the lens 432 and toward the cooler elements 441, 441A. For example, any condensate (which is created at the build platform 428) is repelled from going upstream by both the heated elements 440, 440A and the laminar gas being flown into the chamber 424 through the inlet ports 442. The condensate, then moving in a downstream direction is carried by the laminar flow, by the repelling phenomenon of the heated elements 440, 440A, and by the attracting phenomenon of the cooled elements 441, 441A in a downstream direction toward the cooled elements 441, 441A, where the condensate can be collected thereon.

Figure 7:
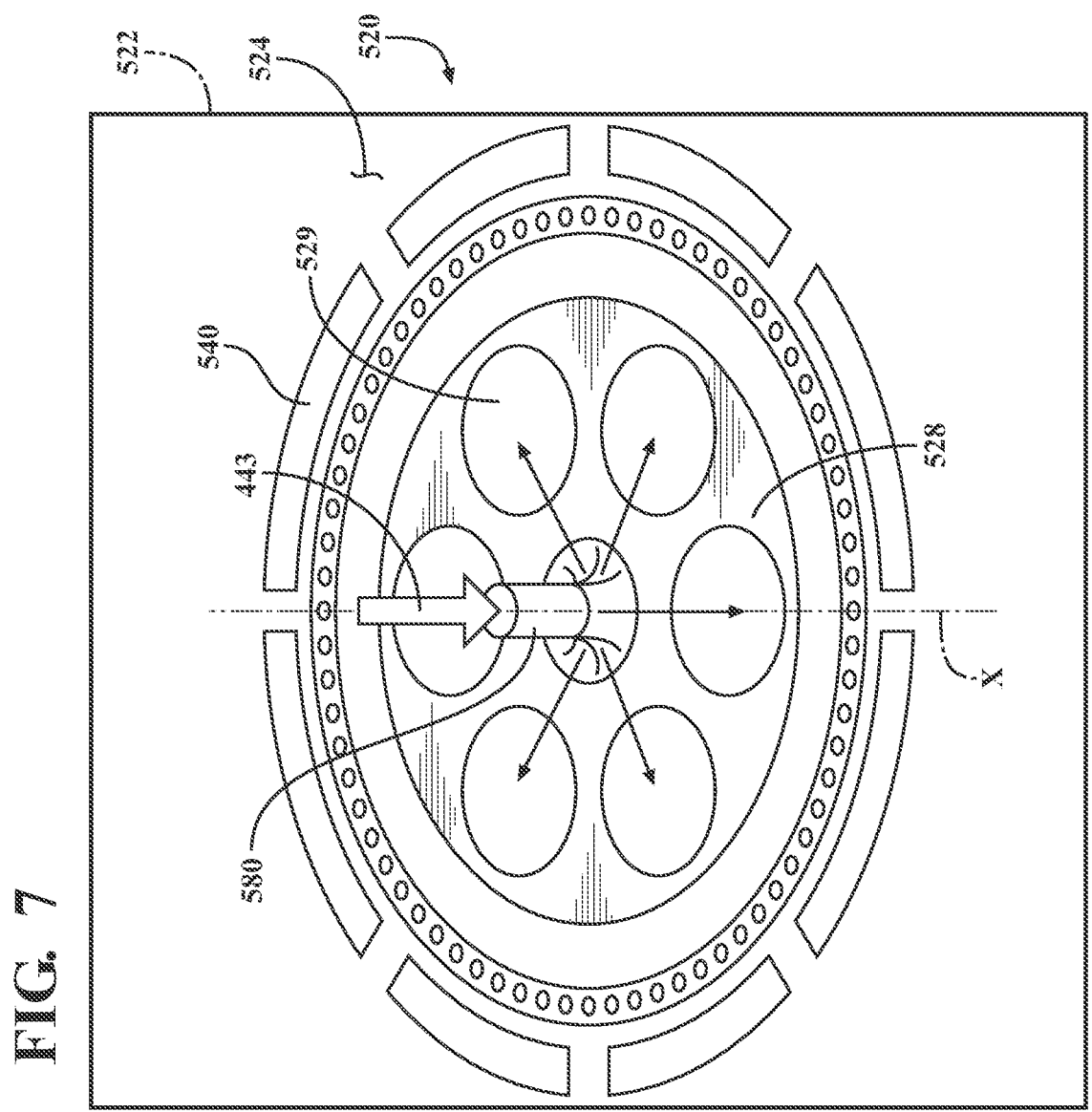
FIG. 7 is a schematic perspective view of still another additive manufacturing system, in accordance with the principles of the present disclosure.

Referring now to FIG. 7, still another system for metal additive manufacturing is illustrated and generally designated at 520. The system 520 may be similar to the systems 20, 120, 220, 320, 420 described above, except where described as being different. For example, the system 520 includes a structure 522 defining a build chamber 524 for manufacturing parts via additive manufacturing. Like the systems 20, 120, 220, 320, 420 described above, the system 520 shown in FIG. 7 is for powder bed fusion additive manufacturing and includes a powder hopper (not shown), wherein powder metal is applied layer by layer onto a build platform 528 through a powder metal applicator (not shown) and each layer is leveled with a wiper (not shown). A portion of each layer is fused with a laser beam, or multiple laser beams, to build the part(s) 529, layer by layer. When the laser beam contacts the powder metal material, metal condensate 38 is created, as shown in FIG. 2.

In the example of FIG. 7, the build platform 528 of the additive manufacturing system 520 is a rotating platform that provides for high throughput. More specifically, the build platform 528 is annular and rotates about a central axis X. The additive manufacturing system 520 is capable of producing workpieces 529 at high volumes by enabling continuous operation of a high-powered laser area scanning system, such as that described in U.S. Patent Publication No. 2018/0311731, which is hereby incorporated by reference in its entirety.

One or more elements 540 may be disposed about the outer perimeter of the annular build platform 528, where the elements 540 are configured to attract the metal condensate like the elements 40, 140, 441, 441A shown and described with respect to FIGS. 1, 3, and 6, respectively. The elements 540 may be spaced along the periphery of the build platform 528 in the shape of a disjointed ring, as shown, or the element 540 could be a single, continuous ring disposed around the build platform 528, if desired. The elements 540 are cooler than the chamber temperature and are disposed on a downstream side of the build platform 528, which is outward of the perimeter of the annular build platform 528.

Like the other elements 40, 140, 441, 441A described as being cooler than the chamber temperature, the elements 540 are configured to attract the condensate within the chamber 524, for example, through principles of thermodynamics and/or thermophoresis, by virtue of a temperature differential between the cooler elements 540 and the chamber 524. The temperature of the cooler elements 540 may be lower than the temperature in the chamber 524 by any desired amount. In some examples, the portion cooler elements 540 are at least 10 degrees Celsius lower in temperature than the air or gas in the chamber 524. For example, the chamber temperature may be ambient at 20-25 degrees Celsius, and the cooler elements 540 may be below 15 degrees Celsius or below 10 degrees Celsius. In some examples, the cooler elements 540 may have a much lower temperature, such as under −180 degrees Celsius, or anywhere in between ambient and as cold as is practically possible to achieve via the elements 540.

Like the cool elements 40, 140, 441, 441A described above, the cool elements 540 could be formed of any desirable material, such as stainless steel, a nickel-chromium superalloy such as that sold under the trademark Inconel, another nickel-based alloy, titanium or a titanium alloy, or aluminum or an aluminum alloy, by way of example. Conductive materials are preferred. The elements 540 may be cooled in any desirable way, such as in the manners described above with respect to FIGS. 1 and 3.

The system 520 may also include a repelling gas flow system that flows warm or hot gas 443 from the center of the build platform 528 through a tube 580 and out across the part(s) 529 to the outer cool elements 540. The tube 580 is disposed along the central axis X and configured to deliver the heated gas 443 across the build platform 528 to repel the metal condensate toward the element(s) 540. In this way, the condensate is repelled by the hot gas 443 and attracted toward the cool elements 540.

The hot or warm gas 443 is warmer than the chamber temperature. Like the elements 240, 340, 440, 440A described as being warmer than the chamber temperature, the hot or warm gas 443 repels the condensate within the chamber 524, for example, through principles of thermodynamics and/or thermophoresis, by virtue of a temperature differential between the warm/hot gas 443 and the chamber 524. The temperature of the warm/hot gas 443 may be greater than the temperature in the chamber 524 by any desired amount. In some examples, the warm/hot gas 443 is at least 10 degrees Celsius greater in temperature than the air or other gas in the chamber 524. For example, the chamber temperature may be ambient at 20-25 degrees Celsius, and the warm/hot gas temperatures may be above 30 or 35 degrees Celsius. In some examples, the warm/hot gas 443 may have a much higher temperature, such as 50, 100, 150, or 200 degrees Celsius, or greater.

The heated gas 443 and the cool elements 540 cooperate to repel condensate from the central axis X and the parts 529, as well as the laser lens (not shown), and toward the cooler elements 540 disposed along the periphery of the build platform 528. For example, any condensate (which is created at the build platform 528) is repelled from going toward the central axis X by the heated gas 443. The condensate, then moving in a downstream direction toward the periphery of the build platform 528 is carried by the heated gas 443 and by the attracting phenomenon of the cooled elements 540 in a downstream direction toward the cooled elements 540, where the condensate can be collected thereon.

Figure 8:
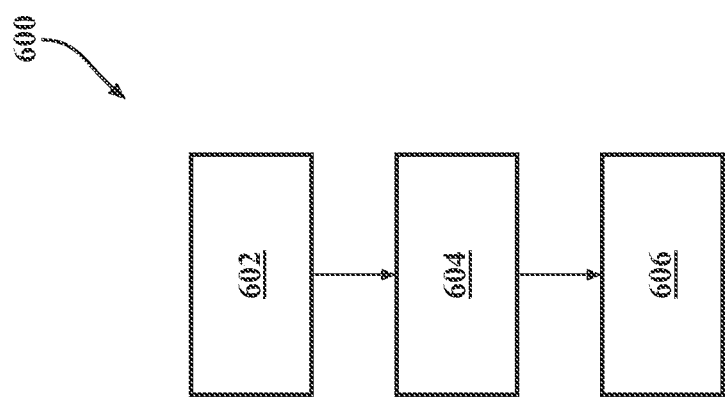
FIG. 8 is a block diagram illustrating a method of additive manufacturing, according to the principles of the present disclosure.

Referring now to FIG. 8, a method of additive manufacturing is illustrated in block diagram format and generally indicated at 600. The method 600 may be performed by a system, such as any of the systems 20, 120, 220, 320, 420, 520 described above, or by another system, by way of example. The method 600 includes a step 602 of disposing powder metal material, layer by layer, onto a build platform within a chamber, the chamber having a chamber temperature. The method 600 also includes a step of 604 directing a laser beam, or multiple laser beams, into the chamber to contact each layer of powder metal material to fuse the powder metal material for additive manufacturing, wherein metal condensate is generated from the laser beam(s) contacting the powder metal material. The method 600 further includes a step 606 of attracting or repelling the metal condensate with an element having an element temperature that is different from the chamber temperature.

The method 600 may include additional options, such as any other option described with respect to the systems 20, 120, 220, 320, 420, 520 above. For example, the method 600 may include providing the chamber temperature and the element temperature as being at least 10 degrees Celsius different from one another. The element temperature may be lower than the chamber temperature, and the step 606 of attracting or repelling may include attracting the metal condensate. The method 600 may also include rotating the element to collect and remove the metal condensate, such as shown in FIG. 3. In some examples, the element temperature may be greater than the chamber temperature, and the step of attracting or repelling 606 may include repelling the metal condensate. The method 600 may include disposing the element around a lens through which the laser beam is directed to repel the metal condensate away from the lens, such as shown in FIG. 4.

In some examples, the method 600 may include flowing an inert gas through the chamber via an inlet disposed on an upstream side of a build platform and an outlet disposed on a downstream side of the build platform. The step of attracting or repelling 606 may include attracting the metal condensate on the downstream side of the build platform via the cooled element, such as shown in FIG. 6. The method 606 may further include repelling the metal condensate on the upstream side of the build platform via a heated element, also shown in FIG. 6. With reference to FIGS. 7-8, the method 600 may include a step of rotating a build platform about a central axis, the element being disposed outwardly around the build platform, and a step of delivering a heated gas across the build platform to repel the metal condensate toward the element.

Any of the systems 20, 120, 220, 320, 420, 520 described above may have its elements combined with those of other systems 20, 120, 320, 420, 520, or elements shown together may be separated. Although the cool or warm/hot elements 40, 140, 240, 340, 440, 440A, 441, 441A, 443, 540 are illustrated for use in powder bed fusion additive manufacturing systems 20, 120, 220, 320, 420, 520, it should be understood that the elements 40, 140, 240, 340, 440, 440A, 441, 441A, 443, 540 would be useful for controlling condensate in other types of additive manufacturing systems, and it is contemplated herein that the elements 40, 140, 240, 340, 440, 440A, 441, 441A, 443, 540 be used in other types of additive manufacturing systems.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. An additive manufacturing system comprising:
    a structure defining a chamber containing a build platform, the chamber having a chamber temperature;
    a powder metal applicator configured to deposit a plurality of layers of a powder metal material to build a part on the build platform via additive manufacturing;
    a laser source configured to direct laser beam onto each of the layers of the powder metal material to thereby fuse together the powder metal material, wherein metal condensate is created by the laser beam contacting the powder metal material; and
    an element spaced apart from the plurality of layers of the powder metal material and configured to move into and out of the chamber, the element having an element temperature different than the chamber temperature, the element being configured to attract or repel the metal condensate by virtue of a temperature differential between the element temperature and the chamber temperature.

2. The additive manufacturing system of claim 1, wherein the temperature differential is at least 10 degrees Celsius.

3. The additive manufacturing system of claim 2, wherein the element temperature is lower than the chamber temperature, and the element is configured to attract the metal condensate.

4. The additive manufacturing system of claim 3, wherein the structure includes a plurality of sidewalls and a floor collectively defining the chamber, and wherein the element includes a plate located on the floor adjacent the build platform.

5. The additive manufacturing system of claim 3, wherein the element includes a rotating platform rotatable about a central axis located outside of the chamber to thereby rotate into and out of the chamber.

6. The additive manufacturing system of claim 2, wherein the element temperature is greater than the chamber temperature, and the element is configured to repel the metal condensate.

7. The additive manufacturing system of claim 6, further comprising a lens through which the laser beam is directed, the element surrounding the lens.

8. The additive manufacturing system of claim 6, further comprising a powder overflow receptacle configured to collect excess powder metal material, the element at least partially surrounding the powder overflow receptacle to repel the metal condensate away from the powder overflow receptacle.

9. The additive manufacturing system of claim 2, further comprising a gas flow system including an inlet disposed on an upstream side of the build platform and an outlet disposed on a downstream side of the build platform, the inlet configured to flow a stream of gas through the chamber to move the metal condensate within the chamber, wherein the element is a cooled element disposed on the downstream side of the build platform to attract the metal condensate, the additive manufacturing system further comprising a heated element disposed on the upstream side of the build platform to repel the metal condensate.

10. The additive manufacturing system of claim 5, further comprising a filter system configured to remove the metal condensate from the rotating platform and to feed the metal condensate to a filter.

11. The additive manufacturing system of claim 3, wherein the build platform is configured to rotate about a central axis, the element at least partially surrounding the build platform.

12. The additive manufacturing system of claim 11, further comprising a tube disposed along the central axis and configured to deliver heated gas across the build platform to repel the metal condensate toward the element.

* * * * *